Figure 1:
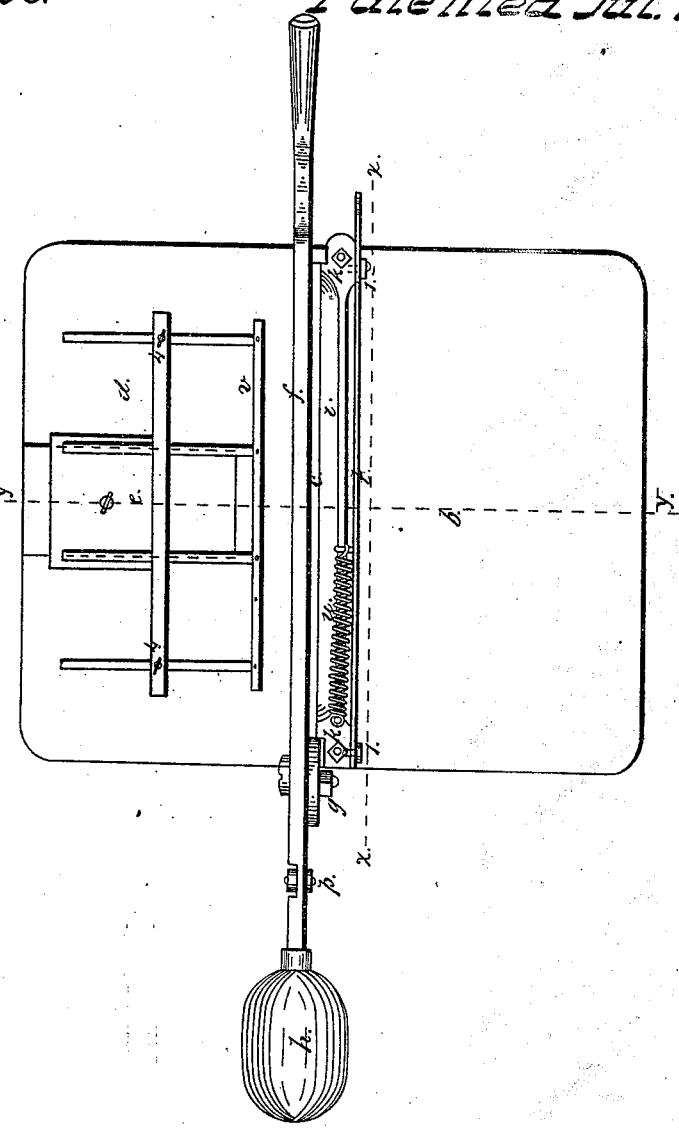

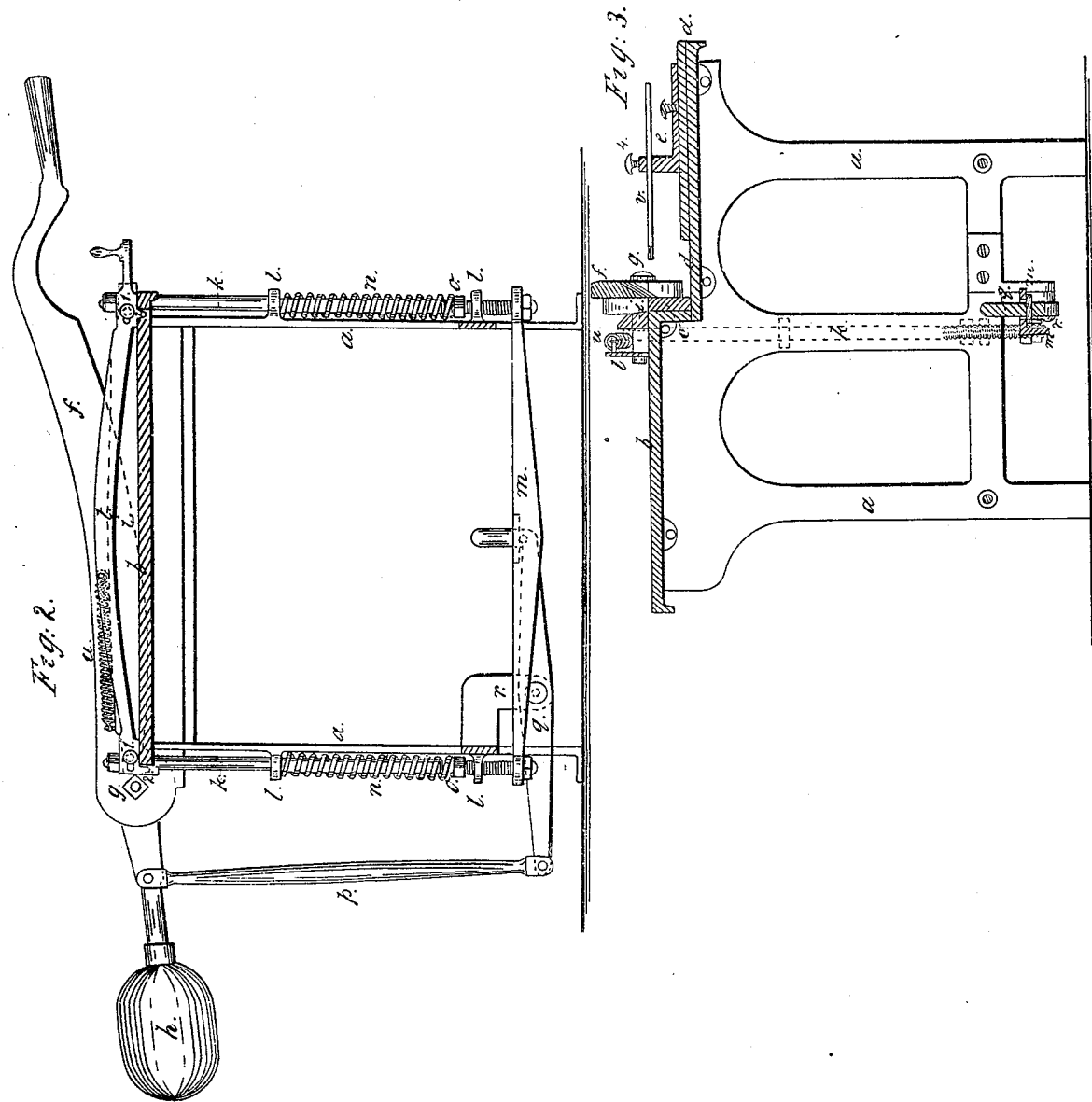

C. Brombacher.
Shears for Cutting Paper.
Nº 48650. Patented Jul. 11. 1865

Witnesses.
Lemuel W. Serrell
Chas H. Smith

Inventor
Chas Brombacher

UNITED STATES PATENT OFFICE.

CHARLES BROMBACHER, OF NEW YORK, N. Y.

IMPROVEMENT IN SHEARS FOR CUTTING PAPER.

Specification forming part of Letters Patent No. 48,650, dated July 11, 1865.

*To all whom it may concern:*

Be it known that I, CHARLES BROMBACHER, of the city, county, and State of New York, have invented, made, and applied to use a certain new and useful Improvement in Shears; and I do hereby declare the following to be a full, clear, and exact description of the said invention, reference being had to the annexed drawings, making part of this specification, wherein—

Figure 1 is a plan of my said shears. Fig. 2 is a longitudinal vertical section at the line $x$ $x$; and Fig. 3 is a cross-section at the line $y$ $y$, Fig. 1.

Similar marks of reference denote the same parts.

In the construction of shears difficulty has heretofore been experienced in holding the material to be cut, particularly where the material is very light and flexible—such as tissue and glazed paper and woven fabrics—and where from twelve to twenty-four thicknesses are cut at an operation. Besides this, the clamping device has been actuated by a separate movement from that of the shear, requiring considerable effort and time on the part of the operator to hold with the clamp while he operated the shear, and to release the clamp while adjusting the material to be cut.

The nature of my said invention consists in, first, the combination of a stationary or bed cutter, a moving shear or cutter, a clamping-bar, and springs acting on said clamping-bar to hold the material while being cut, without the operator having to exert any power to hold the material by the clamp, thereby leaving him at liberty to operate the shear or cutter; second, in the combination of a spring clamping-bar with a stationary and moving shear or cutter, and with mechanism connecting the shear and said spring-clamp, so that the upward movement of the moving cutter shall release the clamping-bar; third, in the formation of the clamping-bar with a beveled edge adjacent to the shear, so that the material shall be held as closely to the shear as possible, and at the same time the operator is enabled to observe the action of the shear in cutting without his view being obstructed by the clamping-bar; fourth, in providing a sustaining-slide, in combination with the clamping-bar, that can be employed for keeping the said clamping-bar sufficiently elevated for the material to be cut freely to pass beneath the same when the material is of a nature not to require the use of a clamp, or where both hands are required for adjusting the material—such as silk, flannel, &c.—to place the edge thereof against the gage; and, fifth, in a movable frame combined with the adjustable gage and shear for sustaining light or flexible material and preventing its sagging down while being slid across, so that its edge shall take against the gage and determine accurately the width of material cut. If this frame were not employed, it would be impossible to cut pieces of flexible material of an exact size, on account of their sagging down.

In the drawings, $a$ is a frame sustaining the table $b$, at the edge of which the stationary or bed shear $c$ is attached, and also the table $d$, upon which is a V-slide, sustaining the gage $e$, which is to be adjusted in any convenient manner.

$f$ is the moving shear, jointed at $g$ to the bed-shear $c$, and provided with a counter-weight, $h$, that is sufficient to prevent the shear falling.

$i$ is the clamping-bar, acting to hold the material to the bed $b$ when placed beneath it. This clamping-bar is beveled or formed rounding upon the side next to the shear $f$. (See Fig. 2.)

In cutting material with shears of this character it is necessary to trim the edges of said material before using the gage, otherwise the first pieces cut would not be of uniform width. In very light and soft material the clamp has to be about one-eighth of an inch from the edge of the cutter, so as to hold properly, in which case a square clamp would obstruct the light and compel the operator to guess at the width necessary to be trimmed off. My improved beveled clamp enables the operator to see the edge of the shears and trim off only so much of the edge of the material as may be necessary.

From the ends of the clamping-bar $i$ rods $k$ $k$ pass through guides $l$ $l$ to the cross-head $m$, and $n$ $n$ are springs adjusted in their power by nuts $o$ $o$, said springs acting to hold the clamping-bar firmly upon any material that is introduced between said clamping-bar and the bed $b$. This spring clamping-bar may be raised by any suitable device, while the material to be cut is passed beneath the same and adjusted to its position.

From the end of the moving shear near the counterpoise $h$ a rod, $p$, passes down to a lever at $q$, on a fulcrum, $r$, the inner end of which acts below a projection at the center of the cross-head $m$. The parts are so adjusted that when the shear $c$ is fully elevated at its moving end the spring clamping-bar $i$ shall have been raised sufficiently for the release of the material beneath said clamping-bar, so that it can be adjusted, but as the said shear is brought down the end of the lever $q$ is drawn down from contact with the projection on the cross-head $m$, so that the spring-clamp is fully operative before the shear commences to cut.

Upon the side of the clamping-bar $i$ is a sliding rod, $t$, with a handle at the end, and said rod is sustained by bolts 1 in slots or other suitable means, and is provided with short legs 2 2, which, when in a normal position, pass into holes in the bed $b$; but when the clamping-bar $i$ is fully raised the said rod may be pulled endwise, and the legs 2 2, coming over the surface of the bed, will sustain the said clamping-bar so that it will be inoperative.

I employ a contractile spring, $n$, that is only sufficiently strong to draw the bar $t$ endwise and bring it back to a normal position when the shear $f$ is raised sufficiently to relieve the ends of the legs 2 from friction on the surface of the bed $b$. This arrangement serves two purposes. One is to keep the clamp up and from operating, so as to allow the shears to work when cutting material such as straw-boards, which do not require holding; secondly, to allow the operator to use both hands in placing material which is not stiff enough to be moved with one hand. In this case it is necessary to suspend the clamp before every operation, and to facilitate the working of this apparatus the spring $n$ is attached to release the clamp after the material has been placed, the operator then, taking hold of the moving cutter before bringing it down, raises it slightly, which relieves the sliding bar $t$ and allows the clamp to resume its position.

The gage $e$ is formed with mortises through which the arms of the sheet-sustainer $v$ pass, and screws are provided at 4 to clamp the same when adjusted to position, the object of this being to sustain the material being cut as it extends across from the bed-shear to the gage $e$, in order that accuracy in the width of thin or flexible materials may be obtained. This sustainer $v$ may be made sufficiently light, so that its edge near the shear $c$ may spring down, if necessary, with the material being cut while under the action of the moving shear $f$. When the gage $e$ is adjusted the sheet-sustainer $v$ is also adjusted to the proper position.

What I claim, and desire to secure by Letters Patent, is—

1. The combination of a stationary shear, a moving cutter, and a clamping-bar, actuated by springs to hold the material to the bed while being cut, as and for the purposes specified.

2. The combination of a stationary shear, a moving cutter, a spring clamping-bar, and mechanism, substantially as specified, between the moving shear and the spring clamping-bar, whereby the upward movement of the shear releases the spring clamping-bar, substantially as set forth.

3. Forming the clamping-bar with a beveled edge next to the shears, for the purposes specified.

4. The sustaining slide-rod $t$, fitted substantially as specified, in combination with the spring clamping-bar, for the purposes set forth.

5. The movable sustainer $v$, in combination with an adjustable gage, $e$, for the purposes specified.

In witness whereof I have hereunto set my signature this 6th day of April, 1865.

CHAS. BROMBACHER.

Witnesses:
LEMUEL W. SERRELL,
CHAS. H. SMITH.